United States Patent
McLeod et al.

(10) Patent No.: US 10,222,456 B2
(45) Date of Patent: Mar. 5, 2019

(54) RANGE DETECTOR DEVICE WITH ESTIMATED SPREAD VALUE AND RELATED METHODS

(71) Applicant: STMICROELECTRONICS (RESEARCH & DEVELOPMENT) LIMITED, Marlow Bucks (GB)

(72) Inventors: Stuart McLeod, Edinburgh (GB); Donald Baxter, Stirling (GB); Sam Lee, Edinburgh (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 303 days.

(21) Appl. No.: 15/143,874

(22) Filed: May 2, 2016

(65) Prior Publication Data

US 2017/0315217 A1    Nov. 2, 2017

(51) Int. Cl.
  *G01S 7/48* (2006.01)
  *G01S 7/483* (2006.01)

(52) U.S. Cl.
  CPC .......... *G01S 7/4808* (2013.01); *G01S 7/483* (2013.01)

(58) Field of Classification Search
  CPC .............................. G01S 17/023; G01S 17/89
  See application file for complete search history.

(56) References Cited

U.S. PATENT DOCUMENTS

| | | | |
|---|---|---|---|
| 6,064,942 A | 5/2000 | Johnson et al. | |
| 7,870,816 B1 | 1/2011 | Willingham et al. | |
| 2005/0027477 A1 | 2/2005 | Li et al. | |
| 2012/0038902 A1* | 2/2012 | Dotson | G01S 17/023 356/4.01 |
| 2012/0194798 A1 | 8/2012 | Crawford | |
| 2015/0077734 A1* | 3/2015 | Habif | G01S 17/107 356/5.03 |
| 2015/0177369 A1* | 6/2015 | Kostamovaara | G01S 17/107 356/5.08 |

FOREIGN PATENT DOCUMENTS

| | | |
|---|---|---|
| EP | 2728376 A1 | 5/2014 |
| WO | 2011161527 A1 | 12/2011 |

* cited by examiner

*Primary Examiner* — Luke D Ratcliffe
(74) *Attorney, Agent, or Firm* — Slater Matsil, LLP

(57) ABSTRACT

A range detector device may include a pulsed light source configured to emit pulsed light to an object, a detector configured to receive reflected pulsed light from the object, and a processor cooperating with the pulsed light source and the detector. The processor may be configured to generate a measured range value to the object, and generate an estimated statistical value for a spread of possible range values based upon a characteristic of the pulsed light source.

20 Claims, 8 Drawing Sheets

RANGE DETECTOR DEVICE WITH ESTIMATED SPREAD VALUE AND RELATED METHODS

TECHNICAL FIELD

The present disclosure relates to the field of range detection, and, more particularly, to range detecting device and related methods.

BACKGROUND

Range finding devices provide the function of estimating a distance from the range finding device to an object. These range finding devices are found in several applications, including for example, proximity detection. A common proximity detection application for range finding devices is within cellular devices. In such devices, the onboard mobile operating system could use the range finding device to determine distance to a user.

In some approaches, the range finding devices provide not only an estimated distance to the object, but also a repeatability metric. In some approaches, the repeatability metric represents a standard deviation from a large sample of estimated distance samples. A potential drawback to this approach is that range finding device may provide slower response since a plurality of estimated distance samples must be taken.

SUMMARY

Generally speaking, a range detector device may include a pulsed light source configured to emit pulsed light to an object, a detector configured to receive reflected pulsed light from the object, and a processor cooperating with the pulsed light source and the detector. The processor may be configured to generate a measured range value to the object, and generate an estimated statistical value for a spread of possible range values based upon at least one characteristic of the pulsed light source. Advantageously, the range detector device may estimate the standard deviation of a single measured range value without additional range measurements.

In particular, the estimated statistical value may comprise an estimated standard deviation of the measured range value. At least one characteristic of the pulsed light source may include an effective pulse width and a pulse width multiplier. The processor may be configured to generate the estimated statistical value further based upon an ambient light characteristic. The processor may be configured to generate the estimated statistical value further based upon a total number of received photons in the reflected pulsed light.

In some embodiments, the processor may be configured to selectively set a pulse width characteristic of the pulsed light source based upon the estimated statistical value. The processor may be configured to generate the estimated statistical value without generating a plurality of measured range values. The processor may be configured to generate the estimated statistical value further based upon a self-interference characteristic. For example, the detector may comprise a single photon avalanche photodiode (SPAD) array, and the pulsed light source may include a vertical-cavity surface-emitting laser (VCSEL).

Another aspect is directed to a method for determining a range to an object. The method includes operating a pulsed light source to emit pulsed light to the object, operating a detector to receive reflected pulsed light from the object, and generating a measured range value to the object. The method may also comprise generating an estimated statistical value for a spread of possible range values based upon at least one characteristic of the pulsed light source.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
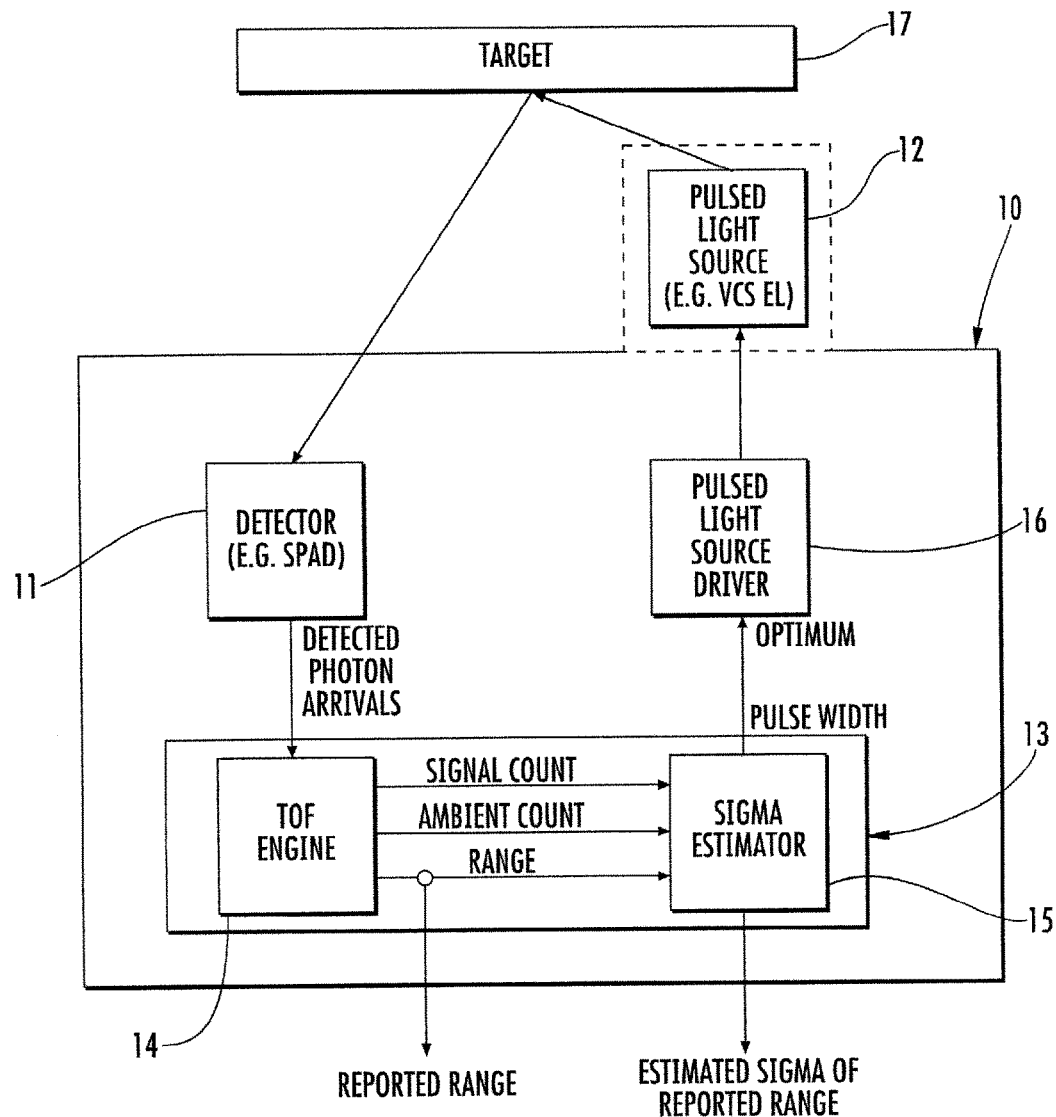
FIG. 1 is a schematic diagram of a range detector device, according to the present disclosure.
Figure 8:
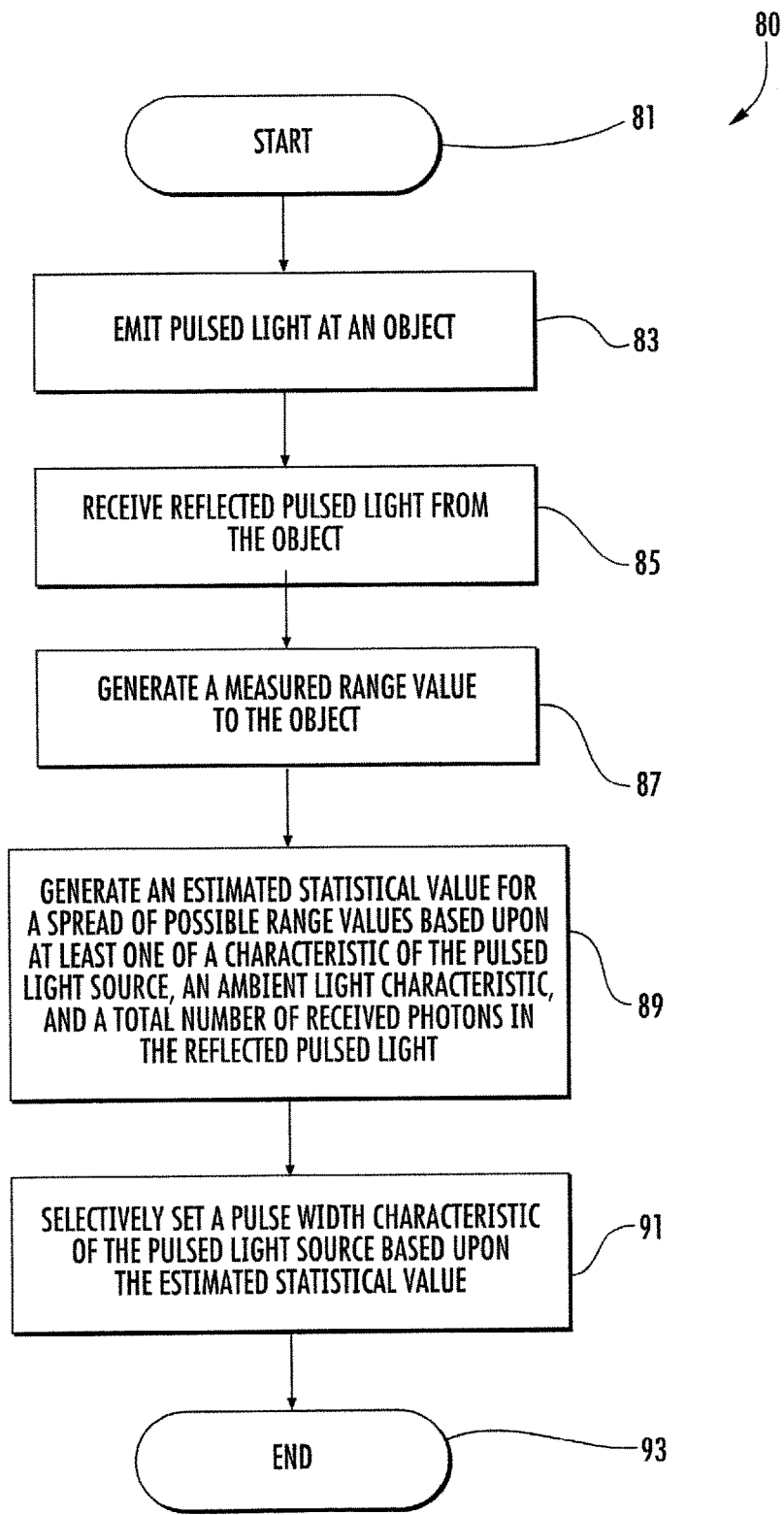
FIG. 8 is a flowchart for a method for determining range to an object using the range detector device, according to the present disclosure.

Referring initially to FIGS. 1 and 8, a range detector device 10 according to the present disclosure is now described. Also, with reference to a flowchart 80, an associated method is also described. (Block 81). The range detector device 10 illustratively includes a pulsed light source 12 configured to emit pulsed light to an object 17, and a pulsed light source driver 16 coupled to the pulsed light source. (Block 83). In some embodiments, the pulsed light source 12 may include a VCSEL, and the pulsed light source driver 16 may comprise a VCSEL driver circuit. As shown in the illustrated embodiment with dashed lines, the pulsed light source 12 may be integrated with the other components in the range detector device 10, i.e. on-chip in a system-on-chip device, or packaged on a separate integrated circuit substrate. In some embodiments, the other components in the range detector device 10 are integrated in a silicon substrate.

The range detector device 10 illustratively includes a detector 11 configured to receive reflected pulsed light from the object 17. (Block 85). For example, in some embodiments, the detector 11 may comprise a SPAD array or a photodiode array. As will be appreciated by the skilled person, the array would comprise a plurality of rows and columns of radiation sensing pixels. Although not shown, the range detector device 10 may comprise a reference detector configured to provide a reference return for the pulsed light source 12. In some embodiments, the reference detector may be carried internally, so at to shield it from external radiation.

The range detector device 10 illustratively includes a processor 13 cooperating with the pulsed light source 12 and the detector 11. The processor 13 is configured to generate a measured range value to the object 17, and generate an estimated statistical value for a spread of possible range values based upon at least one characteristic of the pulsed light source 12. (Blocks 87, 89). In the illustrated embodiment, the processor 13 comprises a time of flight engine/module/circuit 14 and a sigma estimator circuit/module 15.

In other embodiments, the processor 13 may comprise a generic processor with associated instructions stored therein.

In particular, the estimated statistical value may comprise an estimated standard deviation (i.e. a sigma value) of the measured range value. Helpfully, the processor 13 is configured to generate the estimated statistical value without generating a plurality of measured range values. In other words, the processor 13 is configured to generate the estimated statistical value based upon a single estimated statistical value, rather than based upon a large sample of values. Also, in the illustrated embodiment, the at least one characteristic of the pulsed light source 12 includes an effective pulse width and a pulse width multiplier.

The processor 13 is configured to generate the estimated statistical value further based upon one or more of an ambient light characteristic, a total number of received photons in the reflected pulsed light (i.e. received events), and a self-interference characteristic (e.g. cross-talk). In the illustrated embodiment, the processor 13 is configured to selectively set a pulse width characteristic of the pulsed light source 12 based upon one or more of the estimated statistical value, a current target distance, reflectance of the target, and an ambient light level. (Blocks 91, 93). For example, the processor 13 is configured to adjust the pulse width (i.e. reduce pulse width) as the ambient improves (i.e. ambient level drops), thereby providing greater accuracy and speed.

Another aspect is directed to a method for determining a range to an object 17. The method includes operating a pulsed light source 12 to emit pulsed light to the object 17, operating a detector 11 to receive reflected pulsed light from the object, and generating a measured range value to the object. The method may also comprise generating an estimated statistical value for a spread of possible range values based upon at least one characteristic of the pulsed light source 12.

With regards to the above noted features of the processor 13, the following is a detailed exemplary explanation of the computations associated with the features. In particular, the fundamental noise in the range detector device 10 must be ascertained, assuming an ideal optical pulse of width PW, $\sigma_P = PW/\sqrt{12}$. The number of photon events (ph) needed to achieve the required standard deviation (e.g. $\sigma_{Range} = 1.49$ mm) is calculated. In the first step, an averaging formula is derived. Once the formula is rearranged to solve for ph, the pulse width value is substituted (e.g. 3500 ps).

$$\sigma_{Range} = \frac{\sigma_P}{c \times \sqrt{ph}}$$

$$ph = \left(\frac{\sigma_P}{c \times \sigma_{Range}}\right)^2$$

$$ph = \frac{1}{12}\left(\frac{PW}{c \times \sigma_{Range}}\right)^2$$

$$ph = \frac{1}{12}\left(\frac{3500}{6.6 \times 1.49}\right)^2$$

$$ph = 10556$$

The final value notes that 10,556 photons must be received to achieve a goal standard deviation of 1.49 mm with a pulse width of 3.5 ns (i.e. 3500 ps).

The estimated statistical value ($\sigma_{est}$) for the spread of possible range values is derived from the following formula.

$$\sigma_{est} = 1000 * \sqrt{\sigma_{ref}^2 + \sigma_{rtn}^2}$$

$$\sigma_{rtn} = \frac{c * \sqrt{(PWM * \text{Effective Pulse Width} * 10^{-9})^2 + \left(\frac{\text{Ambient Rate}}{\text{Vcsel Rate}} * \text{Effective Amb Width} * 10^{-9}\right)^2}}{2 * \sqrt{12 * \text{signal total events}}}$$

Where PWM (pulse width multiplier)=$(1+[(\Delta T/PW)*(1-ABS(Signal-Xtalk)/(Signal+Xtalk))])^{order}$;
where $\Delta T$=time of flight (target distance (mm)*6.6 ps);
where PW=real pulsed light source width (i.e. not effective);
where Signal=Return signal−Xtalk (peak);
where Order=order of term in PWM formula (1rst, 2nd, etc.);
where ABS=absolute value;
where c=speed of light;
where $\sigma_{rtn}$=an actual return value; and
where $\sigma_{ref}$=a reference return value (can be assumed to be constant and derived from the reference detector).

In an averaging system, the effective pulse width can be the actual VCSEL pulse width. This can be derived either from the VCSEL driver settings or by direct measurement of a representative part. If the system is not an averaging system, then the effective pulse width term is a scaling of the actual VCSEL pulse width depending on the efficiency of the TOF system in question. In this case, it can be derived empirically by matching the measured sigma in the dark for a representative sample.

In the numerator, the left term relates to fundamental noise (i.e. noise relating to uncertainty regarding the emission time of the receive photon). The PWM term multiplying the effective pulse width in the left term of the numerator relates to self-interference. The effective ambient width term in the numerator relates to the impact of ambient light The denominator term is derived from the previous formula in paragraph 14.

Referring now additionally to FIGS. 2-7, several diagrams 20, 30, 40, 50, 60, 70 demonstrate performance of the range detector device 10 in several test environments. For the following simulations, basic fixed timing measurements were used to avoid any complications from timing changes. The following parameters were used: 12 clock timing; 30 ms Timeout; 5%, 17%, 88% targets (i.e. the nominal target reflectances in visible light); with and without cover glass; and 0, 1000, 5000 lux ambient. Advantageously, these diagrams 20, 30, 40, 50, 60, 70 demonstrate that the range detector device 10 is able to provide an estimated standard deviation value (i.e. the estimated statistical value for the spread of possible range values) that closely follows the actual standard deviation under varying environments.

Figure 2:
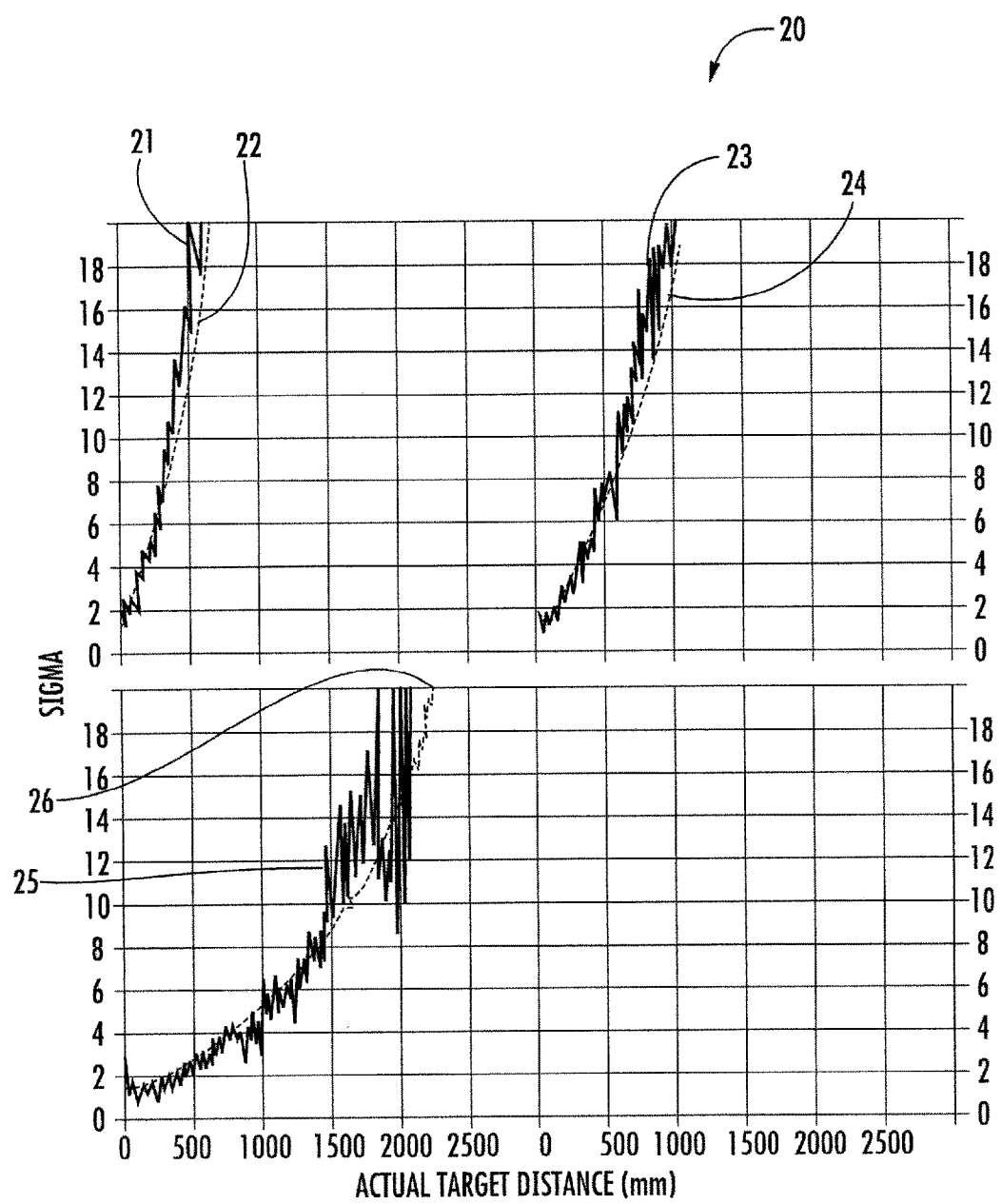
FIGS. 2-7 are diagrams illustrating the estimated statistical value in the range detector device, according to the present disclosure, and typical standard deviation in varying environments.

In FIG. 2, diagram 20 has the following parameters: no cover glass (0 Lux), EPW=10, effective ambient width=11, & Order=2. The three plots relate to three difference targets: labeled black5, grey17, and white88. Curves 21, 23, 25 relate to actual standard deviation calculations (by taking a sample of values), and curves 22, 24, 26 relate to the estimated statistical value for the spread of possible range values (i.e. estimated standard deviation).

Figure 3:
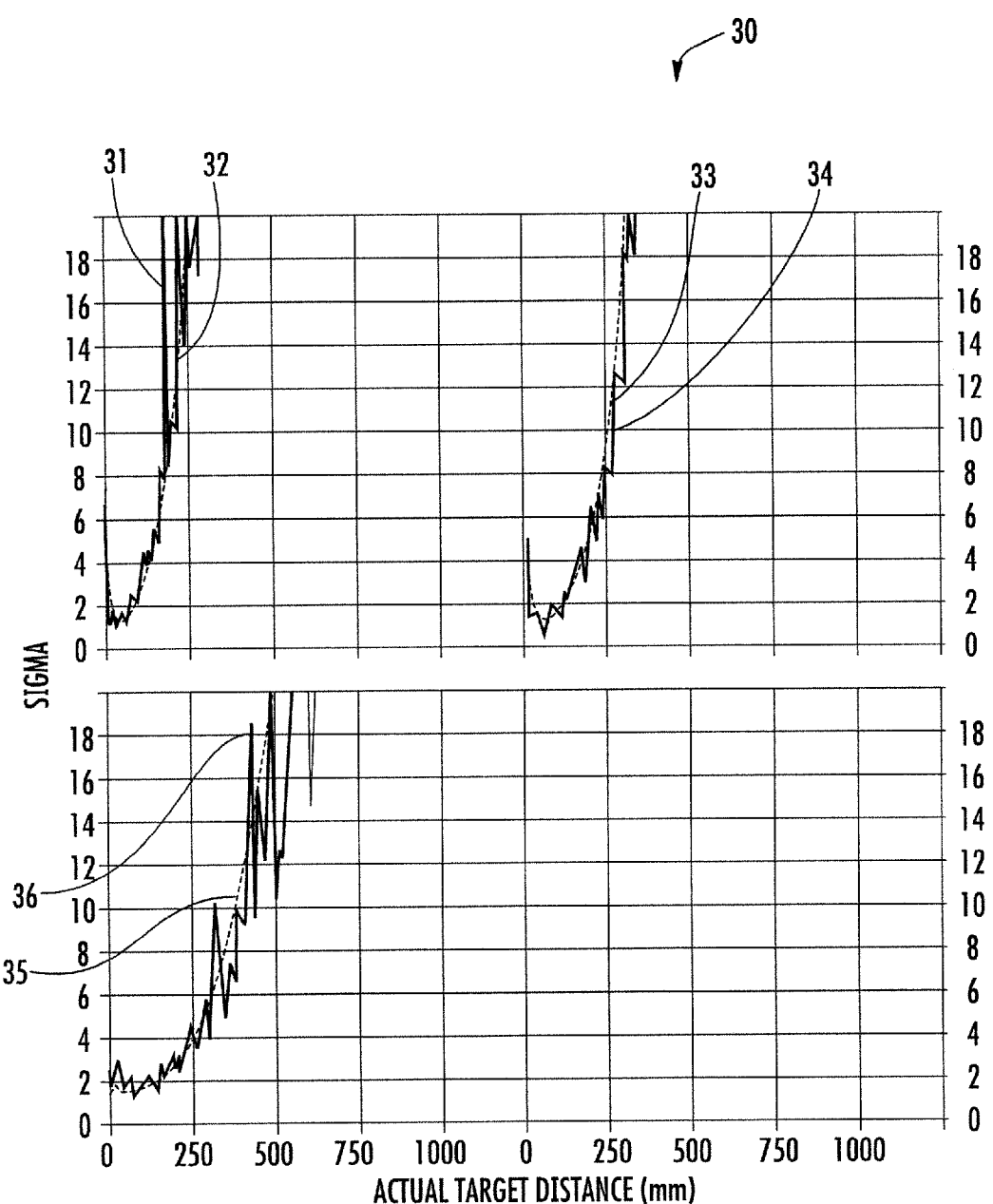

In FIG. 3, diagram 30 has the following parameters: no cover glass (1000 Lux), EPW=10, effective ambient width=11, & Order=2. The three plots relate to three difference targets: labeled black5, grey17, and white88. Curves 31, 33, 35 relate to actual standard deviation calculations (by taking a sample of values), and curves 32, 34, 36 relate to the estimated statistical value for the spread of possible range values (i.e. estimated standard deviation).

Figure 4:
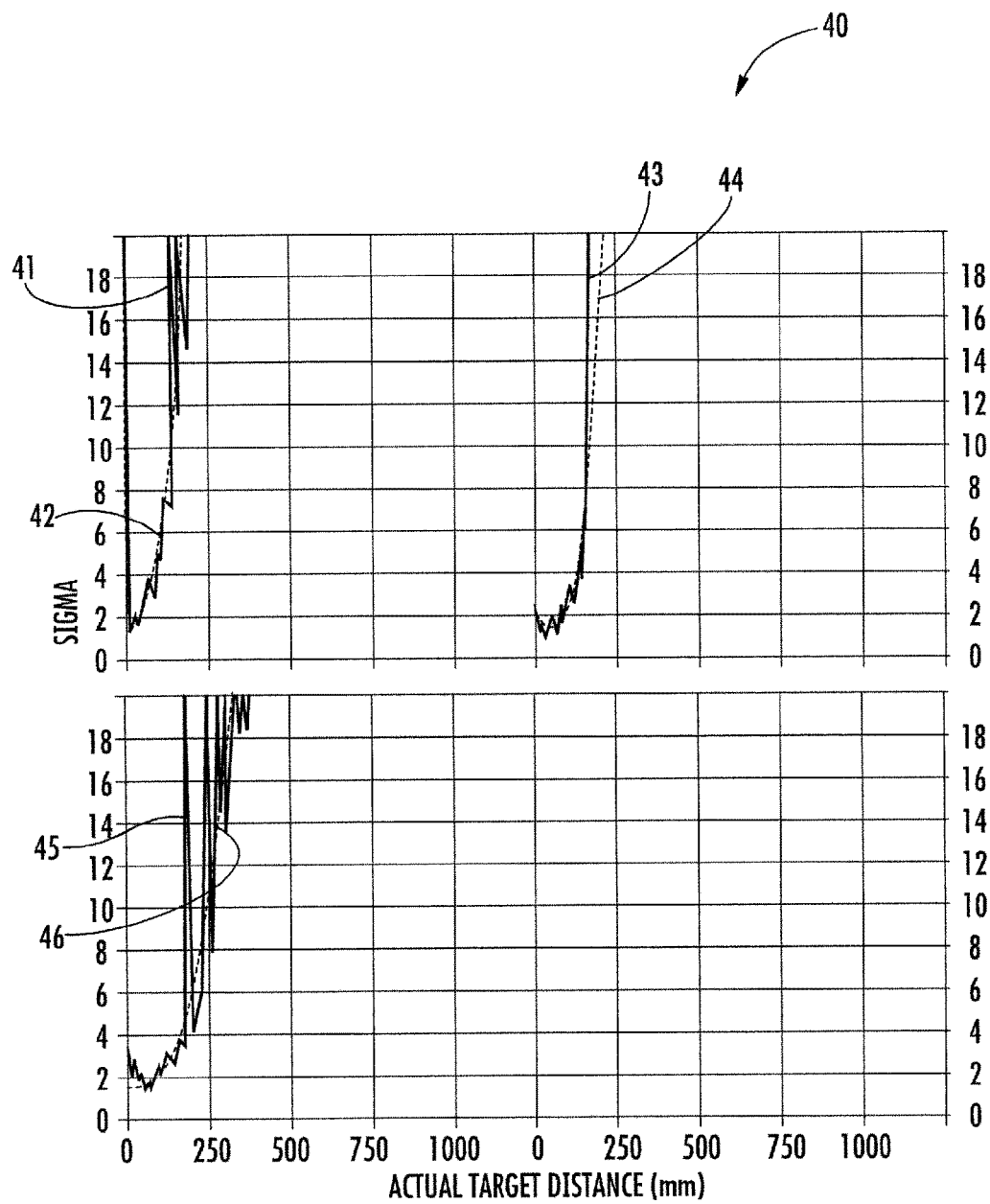

In FIG. 4, diagram 40 has the following parameters: no cover glass (5000 Lux), EPW=10, effective ambient width=11, & Order=2. The three plots relate to three difference targets: labeled black5, grey17, and white88. Curves 41, 43, 45 relate to actual standard deviation calculations (by taking a sample of values), and curves 42, 44, 46 relate to the estimated statistical value for the spread of possible range values (i.e. estimated standard deviation).

Figure 5:
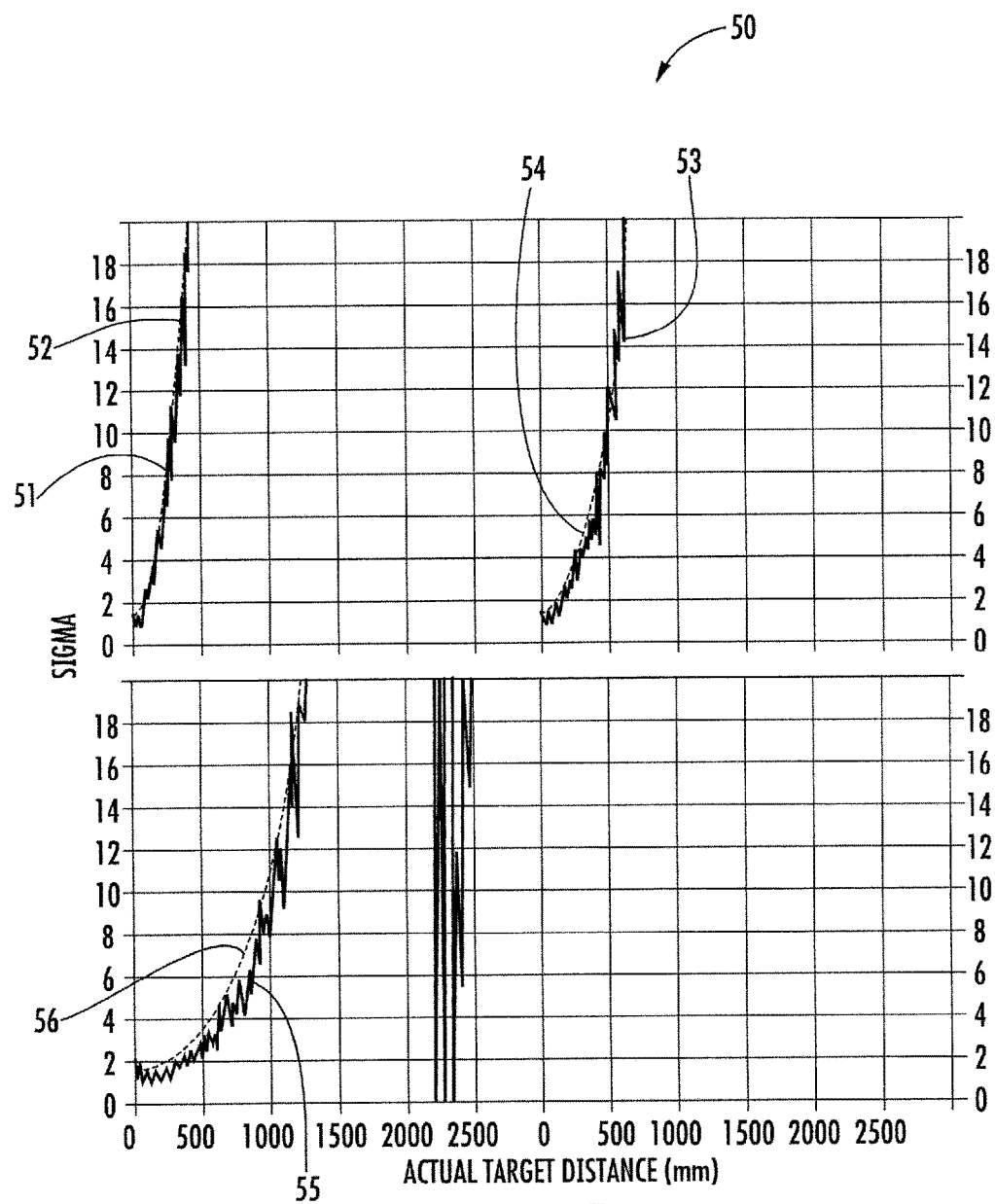

In FIG. 5, diagram 50 has the following parameters: LG cover glass, as available from LG Electronics Inc. of Seoul, South Korea (0 Lux), EPW=10, effective ambient width=11, & Order=2. The three plots relate to three difference targets: labeled black5, grey17, and white88. Curves 51, 53, 55 relate to actual standard deviation calculations (by taking a sample of values), and curves 52, 54, 56 relate to the estimated statistical value for the spread of possible range values (i.e. estimated standard deviation).

Figure 6:
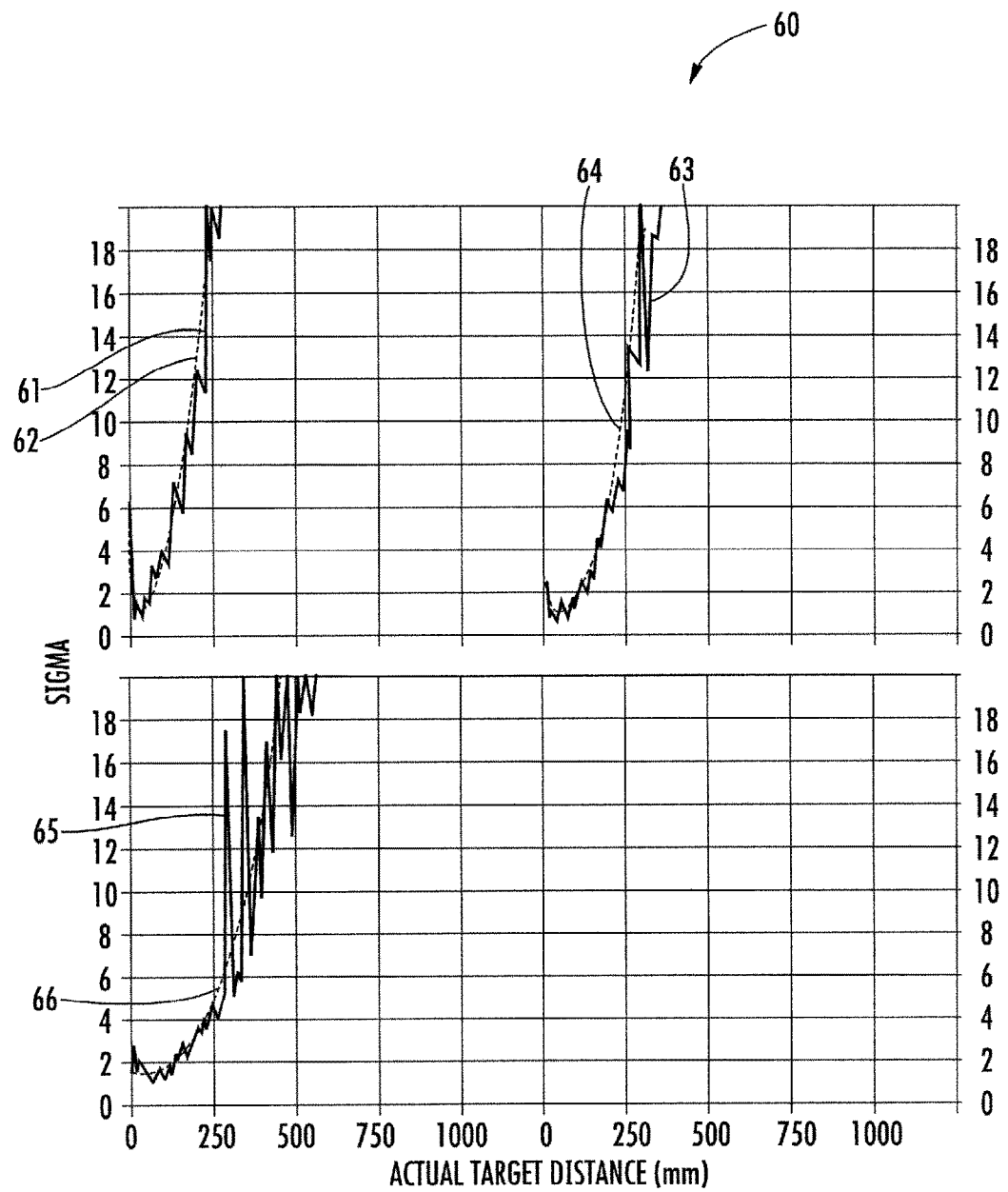

In FIG. 6, diagram 60 has the following parameters: LG cover glass, as available from LG Electronics Inc. of Seoul, South Korea (1000 Lux), EPW=10, effective ambient width=11, & Order=2. The three plots relate to three difference targets: labeled black5, grey17, and white88. Curves 61, 63, 65 relate to actual standard deviation calculations (by taking a sample of values), and curves 62, 64, 66 relate to the estimated statistical value for the spread of possible range values (i.e. estimated standard deviation).

Figure 7:
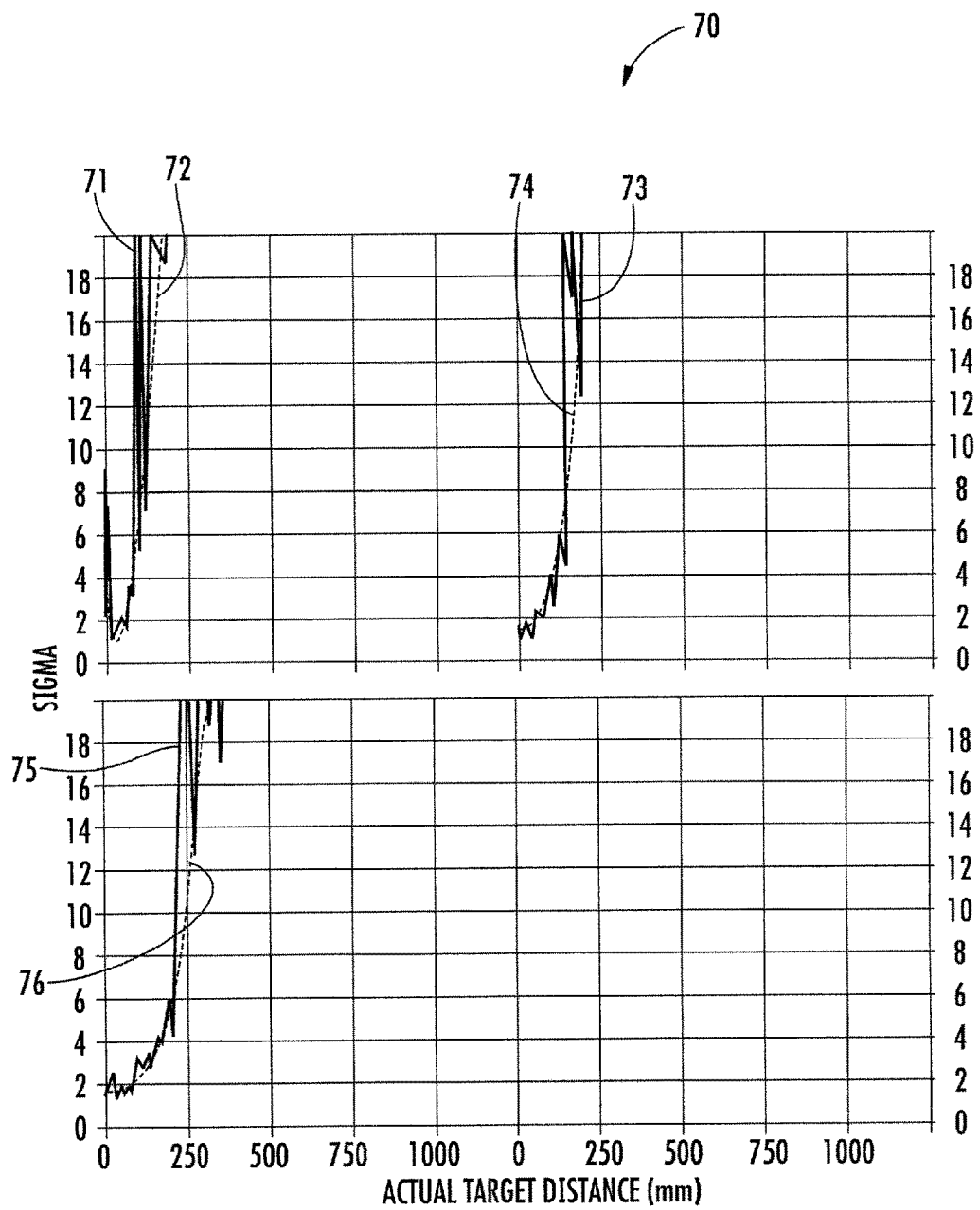

In FIG. 7, diagram 70 has the following parameters: LG cover glass, as available from LG Electronics Inc. of Seoul, South Korea (5000 Lux), EPW=10, effective ambient width=11, & Order=2. The three plots relate to three difference targets: labeled black5, grey17, and white8. Curves 71, 73, 75 relate to actual standard deviation calculations (by taking a sample of values), and curves 72, 74, 76 relate to the estimated statistical value for the spread of possible range values (i.e. estimated standard deviation).

Advantageously, the range detector device 10 can be used to give an estimate of the standard deviation of a given range measurement that is well aligned with measured repeatability. The range detector device 10 can be used in the presence of cross-talk and ambient light. The range detector device 10 is based on elements of averaging and quadrature noise addition.

As well as using the sigma estimator to estimate the sigma of a given range measurement to qualify the measurement, it may also be used to optimize the ranging system setup in real time. For example, the sigma estimator equation can be differentiated with respect to VCSEL pulse width as per the algebra below. When the resulting first derivative of the sigma estimator equation is zero the sigma estimate is at a maxima or minima. Rearranged, the first derivative with sigma set to zero, gives the VCSEL pulse width which gives the minimum sigma in the current conditions (ambient, target distance etc.). The VCSEL pulse width can then be updated in real time to this optimal width to be sure that the system is operating optimally in the current conditions.

In the following, the calculations providing the backend for the processor 13 in the embodiment where the processor 13 is configured to selectively set a pulse width characteristic of the pulsed light source 12 based upon the estimated statistical value are now described.

$$\sigma_{rtn} = c \times \frac{\sqrt{\left(\left(1 + \left[\frac{\Delta T}{PW} \times \left(1 - \left(\frac{SIG-X}{SIG+X}\right)\right)\right]\right)^{ORD} \times K_E \times PW\right)^2 + \left(\frac{AMB}{VPR} \times AMB\_W\right)^2}}{2 \times \sqrt{\frac{12 \times VPR \times PW \times TO}{SEQUENCE}}}$$

$$K_{xtalk} = \Delta T \times \left(1 - \left(\frac{SIG-X}{SIG+X}\right)\right), \quad K_{amb} = \frac{AMB \times AMB\_W}{VPR},$$

$$K_{time} = 2 \times \sqrt{\frac{VPR \times 12 \times TO}{SEQUENCE}}$$

$$\sigma_{rtn} = c \times \frac{\sqrt{\left(\left(1 + \left[\frac{K_{xtalk}}{PW}\right]\right)^{ORD} \times K_E \times PW\right)^2 + (K_{amb})^2}}{K_{time} \times \sqrt{PW}}$$

$$\sigma_{rtn} = c \times \frac{\sqrt{\left(\left(1 + \left[\frac{K_{xtalk}}{PW}\right]\right)^{ORD} \times K_E \times PW\right)^2 + (K_{amb})^2}}{K_{time} \times \sqrt{PW}}$$

$$\sigma_{rtn} = c \times \frac{\sqrt{\left(\left(1 + \left[\frac{K_{xtalk}}{PW}\right]\right)^{ORD} \times K_E \times PW\right)^2 + (K_{amb})^2}}{K_{time} \times \sqrt{PW}}$$

$$\sigma_{rtn} = \frac{c}{K_{time}} \times \sqrt{\left(1 + \left[\frac{K_{xtalk}}{PW}\right]\right)^2 \times K_E^2 \times PW + \frac{K_{amb}^2}{PW}}$$

$$\sigma_{rtn} = \frac{c}{K_{time}} \times \sqrt{\left(1 + 2 \times \frac{K_{xtalk}}{PW} + \left(\frac{K_{xtalk}}{PW}\right)^2\right) \times K_E^2 \times PW + \frac{K_{amb}^2}{PW}}$$

$$\sigma_{rtn} = \frac{c}{K_{time}} \times \sqrt{\left((K_E^2 \times PW) + (2 \times K_{xtalk} \times K_E^2) + \frac{(K_E^2 \times K_{xtalk}^2)}{PW}\right) + \frac{K_{amb}^2}{PW}}$$

$$\sigma_{rtn} = \frac{c}{K_{time}} \times \sqrt{\left((K_E^2 \times PW) + (2 \times K_{xtalk} \times K_E^2) + \frac{(K_E^2 \times K_{xtalk}^2)}{PW}\right) + \frac{K_{amb}^2}{PW}}$$

$$\frac{d\sigma_{rtn}}{dPW} =$$

$$\frac{c}{2 \times K_{time}} \times \frac{K_E^2 - \frac{K_E^2 \times K_{xtalk}^2}{PW^2} - \frac{K_{amb}^2}{PW^2}}{\sqrt{\left((K_E^2 \times PW) + (2 \times K_{xtalk} \times K_E^2) + \frac{(K_E^2 \times K_{xtalk}^2)}{PW}\right) + \frac{K_{amb}^2}{PW}}}$$

$$0 = K_E^2 - \frac{K_E^2 \times K_{xtalk}^2}{PW^2} - \frac{K_{amb}^2}{PW^2}$$

$$0 = K_E^2 \times PW^2 - K_E^2 \times K_{xtalk}^2 - K_{amb}^2$$

$$PW^2 = \frac{K_E^2 \times K_{xtalk}^2 + K_{amb}^2}{K_E^2}$$

$$PW = \sqrt{K_{xtalk}^2 + \frac{K_{amb}^2}{K_E^2}}$$

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A range detector device comprising:
a pulsed light source configured to emit pulsed light to an object;

a detector configured to receive reflected pulsed light from the object; and a processor cooperating with said pulsed light source and said detector, said processor configured to
generate a measured range value to the object, and
generate an estimated statistical value for a spread of possible range values based upon a self-interference characteristic and at least one characteristic of said pulsed light source.

2. The range detector device of claim 1 wherein the estimated statistical value comprises an estimated standard deviation of the measured range value.

3. The range detector device of claim 1 wherein the at least one characteristic of said pulsed light source comprises an effective pulse width and a pulse width multiplier.

4. The range detector device of claim 1 wherein said processor is configured to generate the estimated statistical value further based upon an ambient light characteristic.

5. The range detector device of claim 1 wherein said processor is configured to generate the estimated statistical value further based upon a total number of received photons in the reflected pulsed light.

6. The range detector device of claim 1 wherein said processor is configured to selectively set a pulse width characteristic of said pulsed light source based upon the estimated statistical value.

7. The range detector device of claim 1 wherein said processor is configured to generate the estimated statistical value without generating a plurality of measured range values.

8. The range detector device of claim 1 wherein said detector comprises a single photon avalanche photodiode (SPAD) array; and wherein said pulsed light source comprises a vertical-cavity surface-emitting laser (VCSEL).

9. A range detector device comprising:
a pulsed light source configured to emit pulsed light to an object;
a detector configured to receive reflected pulsed light from the object; and
a processor cooperating with said pulsed light source and said detector, said processor configured to
generate a measured range value to the object,
generate an estimated standard deviation for a spread of possible range values based upon a self-interference characteristic and at least one characteristic of said pulsed light source and without generating a plurality of measured range values, and
selectively set a pulse width characteristic of said pulsed light source based upon the estimated standard deviation.

10. The range detector device of claim 9 wherein the at least one characteristic of said pulsed light source comprises an effective pulse width and a pulse width multiplier.

11. The range detector device of claim 9 wherein said processor is configured to generate the estimated standard deviation further based upon an ambient light characteristic.

12. The range detector device of claim 9 wherein said processor is configured to generate the estimated standard deviation further based upon a total number of received photons in the reflected pulsed light.

13. The range detector device of claim 9 wherein said detector comprises a single photon avalanche photodiode (SPAD) array; and wherein said pulsed light source comprises a vertical-cavity surface-emitting laser (VCSEL).

14. A method for determining a range to an object, the method comprising:
operating a pulsed light source to emit pulsed light to the object;
operating a detector to receive reflected pulsed light from the object;
generating a measured range value to the object; and
generating an estimated statistical value for a spread of possible range values based upon a self-interference characteristic and at least one characteristic of the pulsed light source.

15. The method of claim 14 wherein the estimated statistical value comprises an estimated standard deviation of the measured range value.

16. The method of claim 14 wherein the at least one characteristic of the pulsed light source comprises an effective pulse width and a pulse width multiplier.

17. The method of claim 14 wherein the generating of the estimated statistical value is further based upon an ambient light characteristic.

18. The method of claim 14 wherein the generating of the estimated statistical value is further based upon a total number of received photons in the reflected pulsed light.

19. The method of claim 14 further comprising selectively setting a pulse width characteristic of the pulsed light source based upon the estimated statistical value.

20. The method of claim 14 wherein the generating of the estimated statistical value is without generating a plurality of measured range values.

* * * * *